United States Patent
Chen et al.

(10) Patent No.: US 10,684,452 B2
(45) Date of Patent: Jun. 16, 2020

(54) OPTICAL LENS SYSTEM

(71) Applicant: ABILITY ENTERPRISE CO., LTD., New Taipei (TW)

(72) Inventors: Jung-Yao Chen, New Taipei (TW); Yu-Min Chang, New Taipei (TW); Shuo-Hsien Cheng, New Taipei (TW)

(73) Assignee: ABILITY ENTERPRISE CO., LTD., New Taipei (TW)

( * ) Notice: Subject to any disclaimer, the term of this patent is extended or adjusted under 35 U.S.C. 154(b) by 24 days.

(21) Appl. No.: 15/458,068

(22) Filed: Mar. 14, 2017

(65) Prior Publication Data

US 2017/0285299 A1    Oct. 5, 2017

(30) Foreign Application Priority Data

Mar. 29, 2016  (TW) .............................. 105109875 A

(51) Int. Cl.
*G02B 3/02*   (2006.01)
*G02B 13/00*  (2006.01)
*G02B 13/04*  (2006.01)
*G02B 9/64*   (2006.01)

(52) U.S. Cl.
CPC ............. *G02B 13/006* (2013.01); *G02B 9/64* (2013.01); *G02B 13/0045* (2013.01); *G02B 13/04* (2013.01)

(58) Field of Classification Search
CPC .......... G02B 9/62; G02B 9/64; G02B 13/006; G02B 13/0045; G02B 13/04; G02B 13/18; G02B 15/16; G02B 15/177; G02B 7/025; G02B 9/06; G02B 13/0015; G02B 13/06; G02B 13/16; G02B 23/243; G02B 27/0025; G02B 13/0065; A61B 1/041; A61B 1/00174; A61B 1/063; A61B 1/00096; A61B 1/05
USPC ............... 359/657, 708, 680–690, 738, 740, 359/751–755, 762, 793; 348/241, E5.078
See application file for complete search history.

(56) References Cited

U.S. PATENT DOCUMENTS

2006/0274433 A1\* 12/2006 Kamo ................ G02B 13/0095
359/793
2010/0073776 A1\* 3/2010 Suzuki ................ G02B 15/177
359/682

(Continued)

FOREIGN PATENT DOCUMENTS

CN     103605201 A  *  2/2014
CN     103605201 A     2/2014
CN     104865681 A     8/2015

OTHER PUBLICATIONS

CN Office Action dated Feb. 2, 2019 in Chinese application (No. 201610194848.1).

*Primary Examiner* — Mustak Choudhury
(74) *Attorney, Agent, or Firm* — McClure, Qualey & Rodack, LLP

(57) ABSTRACT

An optical lens is provided. The optical lens includes, in order from an object side to an image-forming side, a first lens having negative refractive power, a second lens having negative refractive power, a third lens having refractive power and having an Abbe number Vd3, a cemented lens having refractive power, and a fourth lens having refractive power and having an Abbe number Vd4, wherein $15 \leq Vd3$ and/or $Vd3 \leq 30$, and $60 \leq Vd4$ and/or $Vd4 \leq 85$.

20 Claims, 8 Drawing Sheets

(56) References Cited

U.S. PATENT DOCUMENTS

| | | | |
|---|---|---|---|
| 2010/0277816 A1* | 11/2010 | Kweon | G02B 9/64 |
| | | | 359/755 |
| 2015/0098138 A1 | 4/2015 | Shirasuna | |
| 2015/0241664 A1 | 8/2015 | Wu | |

* cited by examiner

| Lens | | Surface number | Curvature radius (mm) | Thickness (mm) | Refractive index | Abbe number |
|---|---|---|---|---|---|---|
| L1 | | S1 | 15.196 | 1.09 | 1.73 | 58.7 |
| | | S2 | 3.696 | 1.92 | | |
| L2 | | S3 | 27.739 | 0.55 | 1.73 | 52.7 |
| | | S4 | 3.262 | 2.00 | | |
| L3 | | S5 | 8.84 | 2.73 | 1.92 | 26.0 |
| | | S6 | -8.84 | 0.36 | | |
| St | | St | ∞ | 0.39 | | |
| C1 | L5 | S9 | -37.319 | 1.66 | 1.59 | 66.6 |
| | L6 | S10 | -3.682 | 0.58 | 1.76 | 28.5 |
| | L7 | S11 | 5.208 | 3.12 | 1.59 | 66.6 |
| | | S12 | -5.208 | 0.10 | | |
| L4 | | S7 | 6.289 | 2.27 | 1.50 | 78.6 |
| | | S8 | -17.208 | 3.40 | | |
| Ft | | Sf1 | ∞ | 0.30 | 1.51 | 56.6 |
| | | Sf2 | ∞ | 0.60 | | |
| Co | | Sc1 | ∞ | 0.50 | 1.49 | 68.4 |
| | | Sc2 | ∞ | 0.53 | | |
| | | I | ∞ | 0.00 | | |

FIG. 2A

|     | S7       | S8       |
| --- | -------- | -------- |
| K   | 1.17015  | 0        |
| A4  | -0.00202 | -0.00017 |
| A6  | -1.5E-05 | -5.8E-05 |
| A8  | -4.8E-06 | 6.67E-06 |
| A10 | 8.01E-08 | -6.6E-07 |
| A12 | -1E-08   | 1.75E-08 |
| A14 | 0        | 0        |
| A16 | 0        | 0        |

FIG. 2B

| Lens | | Surface number | Curvature radius (mm) | Thickness (mm) | Refractive index | Abbe number |
|---|---|---|---|---|---|---|
| L1 | | S1 | 11.104 | 0.724 | 1.83 | 40.7 |
| | | S2 | 5.088 | 2.150 | | |
| L2 | | S3 | 10.224 | 0.481 | 1.75 | 53.3 |
| | | S4 | 3.473 | 2.926 | | |
| L8 | | S15 | 19.027 | 1.791 | 1.50 | 77.6 |
| | | S16 | 2.769 | 0.398 | | |
| L3 | | S5 | 4.281 | 1.915 | 2.00 | 17.3 |
| | | S6 | -47.168 | 0.013 | | |
| St | | St | ∞ | 0.412 | | |
| C1 | L6 | S10 | -17.119 | 1.353 | 1.96 | 18.5 |
| | L7 | S11 | 4.061 | 1.680 | 1.62 | 64.5 |
| | | S12 | -4.061 | 0.355 | | |
| L4 | | S7 | 9.773 | 1.841 | 1.62 | 64.5 |
| | | S8 | -9.773 | 3.940 | | |
| Ft | | Sf1 | ∞ | 0.30 | 1.51 | 52.1 |
| | | Sf2 | ∞ | 0.60 | | |
| Co | | Sc1 | ∞ | 0.50 | 1.49 | 68.4 |
| | | Sc2 | ∞ | 0.549 | | |
| | | I | ∞ | 0.00 | | |

FIG. 5

|  | Optical lens OL1 | Optical lens OL2 |
|---|---|---|
| Vd3 | 26.0 | 17.3 |
| Vd4 | 78.6 | 64.5 |
| F | 2.48 | 2.32 |
| TTL | 22.1 | 21.9 |
| F/TTL | 0.11 | 0.10 |
| Y | 3.513 | 3.513 |
| F/Y | 0.71 | 0.66 |
| d | 0.747 | 0.425 |
| d/F | 0.30 | 0.18 |
| FOV | 170 | 170 |
| FNO | 2.84 | 2.82 |
| (FNO×TTL)/(FOV×Y) | 0.105 | 0.103 |
| D | 7.46 | 6.04 |
| D/Y | 2.12 | 1.72 |

FIG. 7

OPTICAL LENS SYSTEM

This application claims the benefit of Taiwan application Serial No. 105109875, filed Mar. 29, 2016, the subject matter of which is incorporated herein by reference.

BACKGROUND OF THE INVENTION

Field of the Invention

The invention relates to an optical lens, and more particularly to an optical lens which is light and thin, small in size, excellent in image quality and wide in viewing angle.

Description of the Related Art

Since hand-held electronic devices with image-capturing function rise and users often carry the hand-held electronic devices to the outdoors for photographing in recent years, the need for an optical lens which is light and thin, small in size and wide in viewing angle has been increased.

Nowadays, the optical systems require both compact length and high performance, so that the ratio of full-length to focal length is reduced. In prior art, the optical lens employs two lenses to capture images. However, the optical lens having only two lenses cannot meet the requirement of high pixel and high optical performance, and can only be matched with a smaller photosensitive element, hereby failing to obtain an image with higher pixel.

Therefore, it is in need to provide a novel optical lens to achieve an optical lens which is light and thin, small in size, excellent in image quality and wide in viewing angle at the same time in the condition that the cost is under control.

SUMMARY OF THE INVENTION

The invention relates to an optical lens having reduced size and good image quality.

According to one embodiment the present invention, an optical lens is provided. The optical lens includes, in order from an object side to an image-forming side, a first lens having negative refractive power, a second lens having negative refractive power, a third lens having refractive power and having an Abbe number Vd3, a cemented lens having refractive power, and a fourth lens having refractive power and having an Abbe number Vd4, wherein 15≤Vd3 and/or Vd3≤30, and 60≤Vd4 and/or Vd4≤85.

According to another embodiment the present invention, an optical lens is provided. The optical lens includes, in order from an object side to an image-forming side, a first lens having negative refractive power, a second lens having refractive power, a third lens being a biconvex lens and having an Abbe number Vd3, a cemented lens having refractive power, and a fourth lens being a biconvex lens and having an Abbe number Vd4, wherein 15≤Vd3 and/or Vd3≤30, and 60≤Vd4 and/or Vd4≤85.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 2A lists one embodiment of the optical lens according to the present invention.

FIG. 2B lists another embodiment of the fourth lens of the optical lens according to the present invention.

FIG. 5 lists one embodiment of another optical lens according to the present invention.

FIG. 7 lists information of the optical lenses according to the embodiments of the present invention.

DETAILED DESCRIPTION OF THE INVENTION

Figure 1:
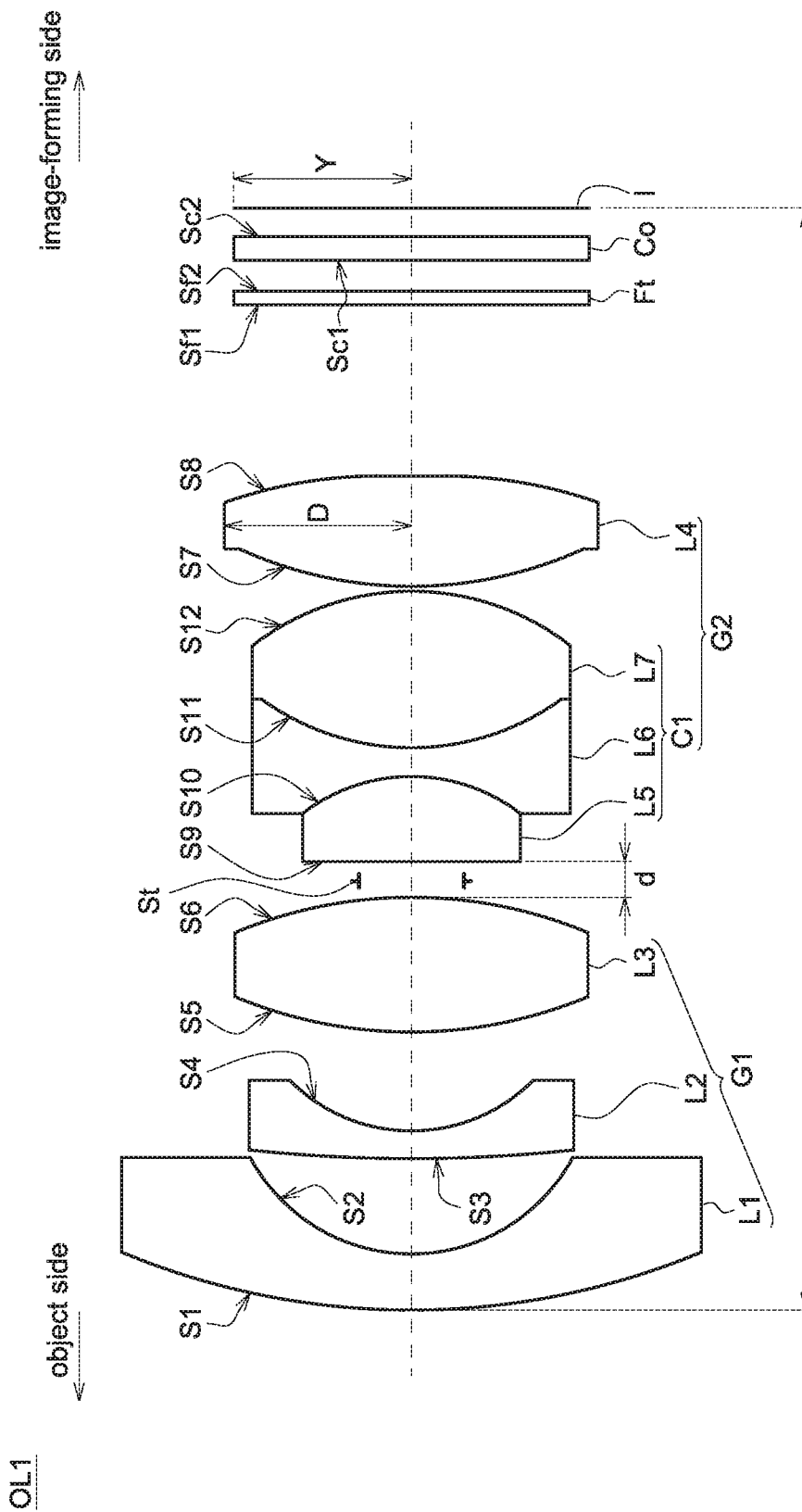
FIG. 1 shows an optical lens according to one embodiment of the present invention.

The embodiments of the present invention are described in details with reference to the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known components and process operations are not described in detail in order not to unnecessarily obscure the present invention. Identical or similar elements of the embodiments are designated with the same or similar reference numerals. While drawings are illustrated in details, it is appreciated that the quantity or sizes of the disclosed components may be greater or less than that disclosed, except expressly restricting the amount or the sizes of the components.

FIG. 1 shows an optical lens OL1 according one embodiment of the present invention. To highlight the features of the present embodiment, the drawings merely show components related to this embodiment, and the irrelevant or minor components are omitted. The optical lens OL1 of the present embodiment may be a wide-angle lens which may be employed in a device with images projecting and/or capturing function. For example, the device may be but not limited to a hand-held communication system, a car lens, a monitor, a digital camera, a digital camera or a projector.

In one embodiment, the optical lens OL1, in order from an object side to an image-forming side, may include a first lens group G1 and a second lens group G2. The first lens group G1 may have negative refractive power, and the second lens group G2 may have positive refractive power.

In one embodiment, the first lens group G1 at least includes a plurality of lenses, and the second lens group G2 at least includes a cemented lens and a lens. In one embodiment, the first lens group G1 may include three or more than three lenses. In another embodiment, the cemented lens may have two or more than two lenses, but the present invention is not limited thereto. In addition, each lens may have refractive power respectively, such as positive refractive power or negative refractive power.

As shown in FIG. 1, the optical lens OL1, in order from the object side to the image-forming side, includes the first lens group G1 at least has a first lens L1, a second lens L2 and a third lens L3 and the second lens group G2 has a cemented lens C1 and a fourth lens L4. In one embodiment, the first lens group G1 has negative refractive power, that is the overall optical effect of the first lens L1, the second lens L2 and the third lens L3 is negative refractive power. The second lens group G2 has positive refractive power, that is the overall optical effect of the cemented lens C1 and the fourth lens L4 is positive refractive power. Furthermore, the cemented lens C1 may include a fifth lens L5, a sixth lens L6 and a seventh lens L7. In one embodiment, the fifth lens L5, the sixth lens L6 and the seventh lens L7 may be arranged in order from the object side to the image-forming side.

In one embodiment, the third lens L3 has an Abbe number Vd3, and Vd3 may satisfy at least one of the following conditions: $15 \leq Vd3$, $16 \leq Vd3$, $17.3 \leq Vd3$, $Vd3 \leq 26$, $Vd3 \leq 28$, $Vd3 \leq 30$, $15 \leq Vd3 \leq 26$, $16 \leq Vd3 \leq 26$, $17.35 \leq Vd3 \leq 26$, $15 \leq Vd3 \leq 28$, $16 \leq Vd3 \leq 28$, $17.3 \leq Vd3 \leq 28$, $15 \leq Vd3 \leq 30$, $16 \leq Vd3 \leq 30$ and $17.3 \leq Vd3 \leq 30$.

As shown in FIG. 1, the third lens L3 may be the lens closest to the image-forming side within the first lens group G1, but the present invention is not limited thereto. In another embodiment, there may be one or more than one lens having refractive power (not shown) between the third lens L3 and the cemented lens C1. In such a condition, Vd3 may be the Abbe number of the third lens L3, or may be an Abbe number of any the lens between the third lens L3 and the cemented lens C1, or an Abbe number of the lens closest to the image-forming side within the first lens group G1.

In one embodiment, the fourth lens L4 has an Abbe number Vd4, and Vd4 may satisfy at least one of the following conditions: $60 \leq Vd4$, $62 \leq Vd4$, $64.5 \leq Vd4$, $Vd4 \leq 78.6$, $Vd4 \leq 81$, $Vd4 \leq 85$, $60 \leq Vd4 \leq 78.6$, $62 \leq Vd4 \leq 78.6$, $64.5 \leq Vd4 \leq 78.6$, $60 \leq Vd4 \leq 81$, $62 \leq Vd4 \leq 81$, $64.5 \leq Vd4 \leq 81$, $60 \leq Vd4 \leq 85$, $62 \leq Vd4 \leq 85$ and $64.5 \leq Vd4 \leq 85$.

As shown in FIG. 1, the fourth lens L4 may be the lens closest to the image-forming side within the second lens group G2, but the present invention is not limited thereto. In another embodiment, there may be one or more than one lens having refractive power (not shown) between the fourth lens L4 and an imaging plane I. In such a condition, Vd4 may be the Abbe number of the fourth lens L4, or may be an Abbe number of any lens between the fourth lens L4 and the imaging plane I, or an Abbe number of the lens closest to the image-forming side.

The optical lens OL1 may further include a focal length F and a length TTL. In one embodiment, the optical lens OL1 may satisfy at least one of the following conditions: $0 \leq F/TTL$, $0.05 \leq F/TTL$, $0.1 \leq F/TTL$, $F/TTL \leq 0.15$, $F/TTL \leq 0.2$, $F/TTL \leq 0.25$, $0 \leq F/TTL \leq 0.25$, $0 \leq F/TTL \leq 0.2$, $0 \leq F/TTL \leq 0.15$, $0.05 \leq F/TTL \leq 0.25$, $0.05 \leq F/TTL \leq 0.2$, $0.05 \leq F/TTL \leq 0.15$, $0.1 \leq F/TTL \leq 0.25$, $0.1 \leq F/TTL \leq 0.2$ and $0.1 \leq F/TTL \leq 0.15$. The length TTL may be a distance between an object-side surface of the lens, which closest to the object side within the optical lens OL1, and the imaging plane I. For example, the length TTL may be a distance from an object-side surface of the first lens group G1 to the imaging plane I that may be along an optical axis OX of the optical lens OL1. Also, the length TTL may be a distance between an object-side surface S1 of the first lens L1 and the imaging plane I.

The optical lens OL1 may further include an image height Y. In one embodiment, the optical lens OL1 may satisfy at least one of the following conditions: $0 \leq F/Y$, $0.3 \leq F/Y$, $0.5 \leq F/Y$, $0.6 \leq F/Y$, $0.66 \leq F/Y$, $F/Y \leq 0.71$, $F/Y \leq 0.75$, $F/Y \leq 0.8$, $F/Y \leq 0.85$, $F/Y \leq 1$, $0 \leq F/Y \leq 0.71$, $0 \leq F/Y \leq 0.75$, $0 \leq F/Y \leq 0.8$, $0 \leq F/Y \leq 0.85$, $0 \leq F/Y \leq 1$, $0.3 \leq F/Y \leq 0.71$, $0.3 \leq F/Y \leq 0.75$, $0.3 \leq F/Y \leq 0.8$, $0.3 \leq F/Y \leq 0.85$, $0.3 \leq F/Y \leq 1$, $0.55 \leq F/Y \leq 0.71$, $0.5 \leq F/Y \leq 0.75$, $0.5 \leq F/Y \leq 0.8$, $0.5 \leq F/Y \leq 0.85$, $0.5 \leq F/Y \leq 1$, $0.6 \leq F/Y \leq 0.71$, $0.6 \leq F/Y \leq 0.75$, $0.6 \leq F/Y \leq 0.8$, $0.6 \leq F/Y \leq 0.85$, $0.6 \leq F/Y \leq 1$, $0.66 \leq F/Y \leq 0.71$, $0.66 \leq F/Y \leq 0.75$, $0.66 \leq F/Y \leq 0.8$, $0.66 \leq F/Y \leq 0.85$ and $0.66 \leq F/Y \leq 1$.

In one embodiment, the optical lens OL1 may satisfy at least one of the following conditions: $0 \leq d/F$, $0.1 \leq d/F$, $0.18 \leq d/F$, $d/F \leq 0.31$, $d/F = 0.4$, $d/F \leq 0.45$, $0 \leq d/F \leq 0.31$, $0 \leq d/F \leq 0.4$, $0 \leq d/F \leq 0.45$, $0.1 \leq d/F \leq 0.31$, $0.1 \leq d/F \leq 0.4$, $0.1 \leq d/F \leq 0.45$, $0.18 \leq d/F \leq 0.31$, $0.18 \leq d/F \leq 0.4$ and $0.18 \leq d/F \leq 0.45$, wherein d may be a distance between the third lens L3 and the cemented lens C1, or may be a distance between the first lens group G1 and the second lens group G2. That is d may be a distance between an image-side surface of the first lens group G1 and an object-side surface of the second lens group G2.

On the other hand, d may also be a distance between an image-side surface S6 of the third lens L3 and an object-side surface S9 of the fifth lens L5.

The optical lens OL1 may further have a field of view FOV. In one embodiment, the optical lens OL1 may satisfy at least one of the following conditions: $140° \leq FOV$, $165° \leq FOV$, $FOV \leq 185°$, $140° \leq FOV \leq 185°$ and $165° \leq FOV \leq 185°$.

The optical lens OL1 may further include an aperture FNO. In one embodiment, the optical lens OL1 may satisfy at least one of the following conditions: $0 \leq (FNO \times TTL)/(FOV \times Y)$, $0.05 \leq (FNO \times TTL)/(FOV \times Y)$, $0.1 \leq (FNO \times TTL)/(FOV \times Y)$, $(FNO \times TTL)/(FOV \times Y) \leq 0.15$, $(FNO \times TTL)/(FOV \times Y) \leq 0.2$, $0 \leq (FNO \times TTL)/(FOV \times Y) \leq 0.15$, $0.05 \leq (FNO \times TTL)/(FOV \times Y) \leq 0.15$, $0.1 \leq (FNO \times TTL)/(FOV \times Y) \leq 0.15$, $0 \leq (FNO \times TTL)/(FOV \times Y) \leq 0.2$, $0.05 \leq (FNO \times TTL)/(FOV \times Y) \leq 0.2$ and $0.1 \leq (FNO \times TTL)/(FOV \times Y) \leq 0.2$.

Furthermore, in one embodiment, the fourth lens L4 may have an effective diameter D including but not limited to an optical effective diameter or a physical diameter. The optical lens OL1 may satisfy at least one of the following conditions: $1.33 \leq D/Y$, $1.5 \leq D/Y$, $1.72 \leq D/Y$, $D/Y \leq 2.12$, $D/Y \leq 2.3$, $D/Y \leq 2.47$, $1.33 \leq D/Y \leq 2.12$, $1.33 \leq D/Y \leq 2.3$, $1.33 \leq D/Y \leq 2.47$, $1.5 \leq D/Y \leq 2.12$, $1.5 \leq D/Y \leq 2.3$, $1.5 \leq D/Y \leq 2.47$, $1.72 \leq D/Y \leq 2.12$, $1.72 \leq D/Y \leq 2.3$ and $1.72 \leq D/Y \leq 2.47$.

In FIG. 1, the fourth lens L4 is the lens closest to the image-forming side, but the present invention is not limited thereto. In another embodiment, there may be one or more than one lens having refractive power (not shown) between the fourth lens L4 and the imaging plane I, and the effective diameter D may be an effective radius of the fourth lens L4 or be an effective radius of the lens closest to the image-forming side.

Besides, in one embodiment, the first lens L1 the second lens L2, the third lens L3, the fourth lens L4, the fifth lens L5, the sixth lens L6 and the seventh lens L7 may respectively be a glass lens made of a glass material or a plastic lens made of a plastic material. And, the plastic material may include, but not limited to, polycarbonate, cyclic olefin copolymer (e.g. APEL), polyester resins (e.g. OKP4 or OKP4HT), and the like, or a mixture material and/or a compound material including at least one of the above-mentioned three materials.

In one embodiment, the first lens L1, the second lens L2, the third lens L3, the fourth lens L4, the fifth lens L5, the sixth lens L6 and the seventh lens L7 may respectively be a spheric lens, a free-form lens or an aspheric lens. For example, the first lens L1, the second lens L2, the third lens L3, the fifth lens L5, the sixth lens L6 and the seventh lens L7 may all be spheric lenses, and the fourth lens L4 may be an aspheric lens including but not limited to an aspheric glass lens or an aspheric plastic lens.

Specifically, each of the free-form lenses has at least one free-form surface; that is, an object-side surface and/or an image-side surface of the free-form lens are/is the free-form surface(s). Each of the aspheric lenses has at least one aspheric surface; that is, an object-side surface and/or an image-side surface of the aspheric lens are/is the aspheric surface(s). Each of the aspheric surfaces satisfies the following equation:

$$Z = \left[\frac{(C*Y^2)}{1+\sqrt{1-(K+1)C^2Y^2}}\right] + \sum (A_i * Y^i)$$

where Z is the coordinate in the optical axis direction, and the direction in which light propagates is designated as positive; $A_4$, $A_6$, $A_8$, $A_{10}$, $A_{12}$, $A_{14}$, and $A_{16}$ are aspheric coefficients; K is coefficient of quadratic surface; C is reciprocal of R (C=1/R); R is the radius of curvature; Y is the coordinate in a direction perpendicular to the optical axis, in which the upward direction away from the optical axis is designated as positive. In addition, each of the parameters or the coefficients of the equation of each of the aspheric surfaces may be independent of one another.

As shown in FIG. 1, about the first lens group G1, the first lens L1 has negative refractive power, the second lens L2 has negative refractive power and the third lens L3 has positive refractive power. As to the second lens group G2, the fifth lens L5 has positive refractive power, the sixth lens L6 has negative refractive power, the seventh lens L7 has positive refractive power, and the fourth lens L4 has positive refractive power. The fifth lens L5, the sixth lens L6 and seventh lens L7 may be glued to be the cemented lens C1.

The object-side surface S1 of the first lens L1 and the object-side surface S3 of the second lens L2 may both have positive refractive rates and may respectively be a convex surface toward the object side. The image-side surface S2, S4 of the first lens L1 and the second lens L2 may both have positive refractive rates and may respectively be a concave surface toward the object side. Furthermore, the first lens L1 and the second lens L2 may be a lens having negative refractive power respectively, such as a convex-concave lens having negative refractive power including but not limited to a convex-concave plastic lens or a convex-concave glass lens. In addition, the object-side surfaces S1, S3 and the image-side surfaces S2, S4 may be a spheric surface, a free-form surface and/or an aspheric surface respectively.

The object-side surface S5 of the third lens L3 and the object-side surface S7 of the fourth lens L4 may both have positive refractive rates and may be a convex surface toward the object side respectively. The image-side surface S6, S8 of the third lens L3 and the fourth lens L4 may both have negative refractive rates and may be a convex surface toward the image-forming side respectively. Furthermore, the third lens L3 and the fourth lens L4 may respectively be a lens having positive refractive power, such as a biconvex lens having positive refractive power including but not limited to a biconvex plastic lens or a biconvex glass lens having positive refractive power. In addition, the object-side surfaces S5, S7 and the image-side surfaces S6, S8 may be a spheric surface, a free-form surface and/or an aspheric surface respectively.

The object-side surface S9 of the cemented lens C1, the object-side surface S9 of the fifth lens L5, may have negative refractive rate and may be a concave surface toward the image-forming side. The bonding surface S10 between the fifth lens L5 and the sixth lens L6 may have negative refractive rate and may curve toward the image-forming side at the optical axis OX. The shapes of the image-side surface of the fifth lens L5 (not designated) and the object-side surface of the sixth lens L6 (not designated) may substantially or approximately the same to the bonding surface S10. The bonding surface S11 between the sixth lens L6 and the seventh lens L7 may have positive refractive rate and may toward the object side at the optical axis OX. The shapes of the image-side surface of the sixth lens L6 (not designated) and the object-side surface of the seventh lens L7 (not designated) may substantially or approximately the same to the bonding surface S11. The image-side surface S12 of the cemented lens C1, the image-side surface S12 of the seventh lens L7, may have negative refractive rate and may be a convex surface toward the image-forming side.

Furthermore, the fifth lens L5 may be a lens having positive refractive power, such as a concave-convex lens having positive refractive power including but not limited to a concave-convex plastic lens or a concave-convex glass lens having positive refractive power. The sixth lens L6 may be a lens having negative refractive power, such as a biconcave lens having negative refractive power including but not limited to a biconcave plastic lens or a biconcave glass lens having negative refractive power. The seventh lens L7 may be a lens having positive refractive power, such as a biconvex lens having positive refractive power including but not limited to a biconvex plastic lens or a biconvex glass lens having positive refractive power. In addition, the object-side surface S9 and the image-side surface S12 of the cemented lens C1 and the surfaces S10, S11 may be a spheric surface, a free-form surface and/or an aspheric surface respectively.

Furthermore, referring to FIG. 1, the optical lens OL1 may further include a stop St and/or a cover Co. Besides, an image capturing unit (not shown) may be disposed on the imaging plane I for photoelectric converting the light beams passed through the optical lens OL1. The stop St may be arranged between any two of the lenses L1-L3 of the optical lens OL1, between the third lens L3 and the cemented lens C1, between the cemented lens C1 and the fourth lens L4, at the object side of the first lens L1, or between the fourth lens L4 and the imaging plane I. For example, the stop St may be arranged between the third lens L3 and the fifth lens L5, but the present invention is not limited thereto. The cover Co may also be arranged between the fourth lens L4 and the imaging plane I.

On the other hand, the optical lens OL1 may further include a filter Ft. The filter Ft may be arranged between the seventh lens L7 and the cover Co. In another embodiment, the cover Co may combine the functions in protecting the image capturing unit and filtering the infrared light beams, and the filter Ft may be omitted.

FIG. 2A lists one embodiment of the optical lens OL1. FIG. 2A includes the curvature radius, the thickness, the refractive index, the Abbe number (coefficient of chromatic dispersion), and so on of each of the lenses. The surface numbers are sequentially ordered from the object side to the image-forming side. For example, "St" shows the stop St, "S1" shows the object-side surface S1 of the first lens L1, "S2" shows the image-side surface S2 of the first lens L1 . . . "Sf1" and "Sf2" respectively show the object-side surface Sf1 and the image-side surface Sf2 of the filter Ft, "Sc1" and "Sc2" respectively show the object-side surface Sc1 and the image-side surface Sc2 of the cover Co. In addition, the "thickness" shows the distance between an indicated surface and the next adjacent surface/interface close to the image-forming side. For example, the "thickness" of the object-side surface S1 is the distance from the object-side surface S1 to the image-side surface S2 of the first lens L1, and the "thickness" of the image-side surface S2 is the distance from the image-side surface S2 to the object-side surface S3 of the second lens L2.

FIG. 2B lists another embodiment of the fourth lens L4 of the optical lens OL1. In this embodiment, the object-side surface S7 and the image-side surface S8 of the fourth lens L4 of the optical lens OL1 are both aspheric surfaces, and each of the coefficients for the aspheric equation may be listed as indicated in FIG. 2B.

Figure 3B:
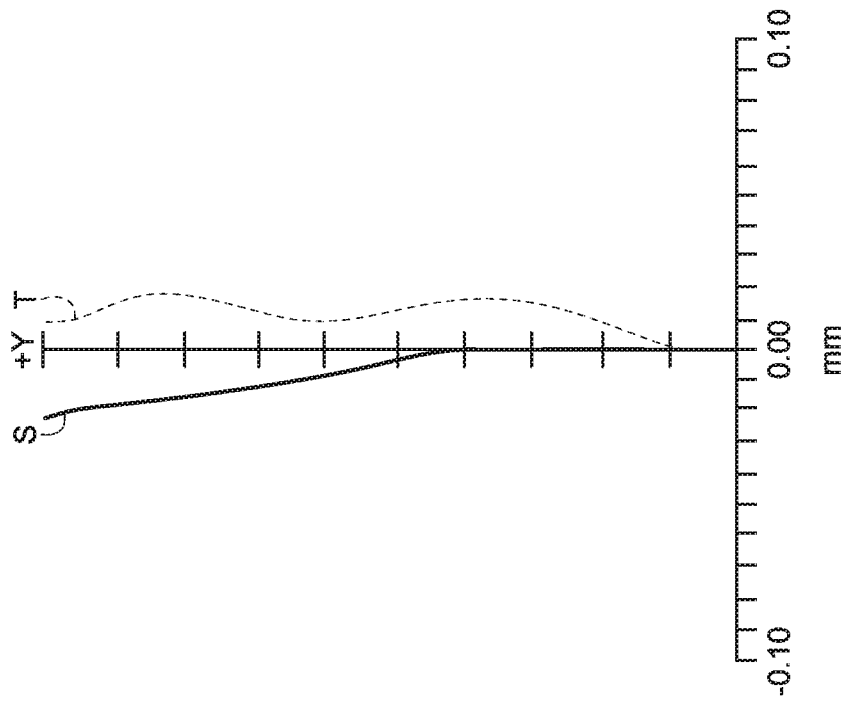
FIG. 3B shows a field curvature chart of the optical lens according to one embodiment of the present invention.
Figure 3A:
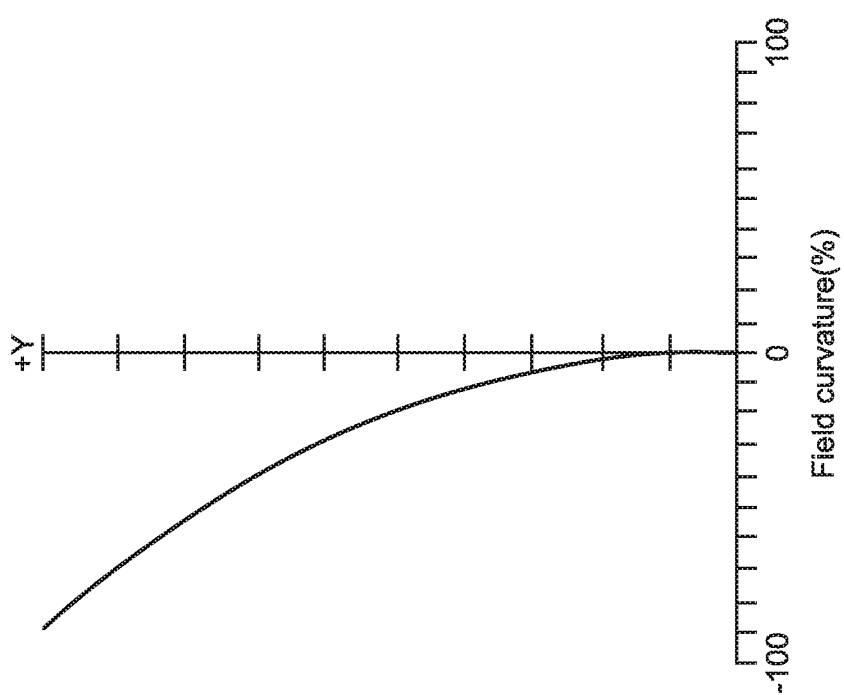
FIG. 3A shows a distortion chart of the optical lens according to one embodiment of the present invention.

FIG. 3A shows a distortion chart of the optical lens OL1 according to one embodiment of the present invention. As shown in the drawing, the distortion values for light beams are all controlled within favorable ranges.

FIG. 3B shows a field curvature chart of the optical lens OL1 according to one embodiment of the present invention. The curves T and S respectively stand for the aberration of the optical lens OL1 to the tangential rays and the sagittal rays. As shown in the drawing, the tangential values and the sagittal values of light beams are all controlled within favorable ranges.

Figure 4:
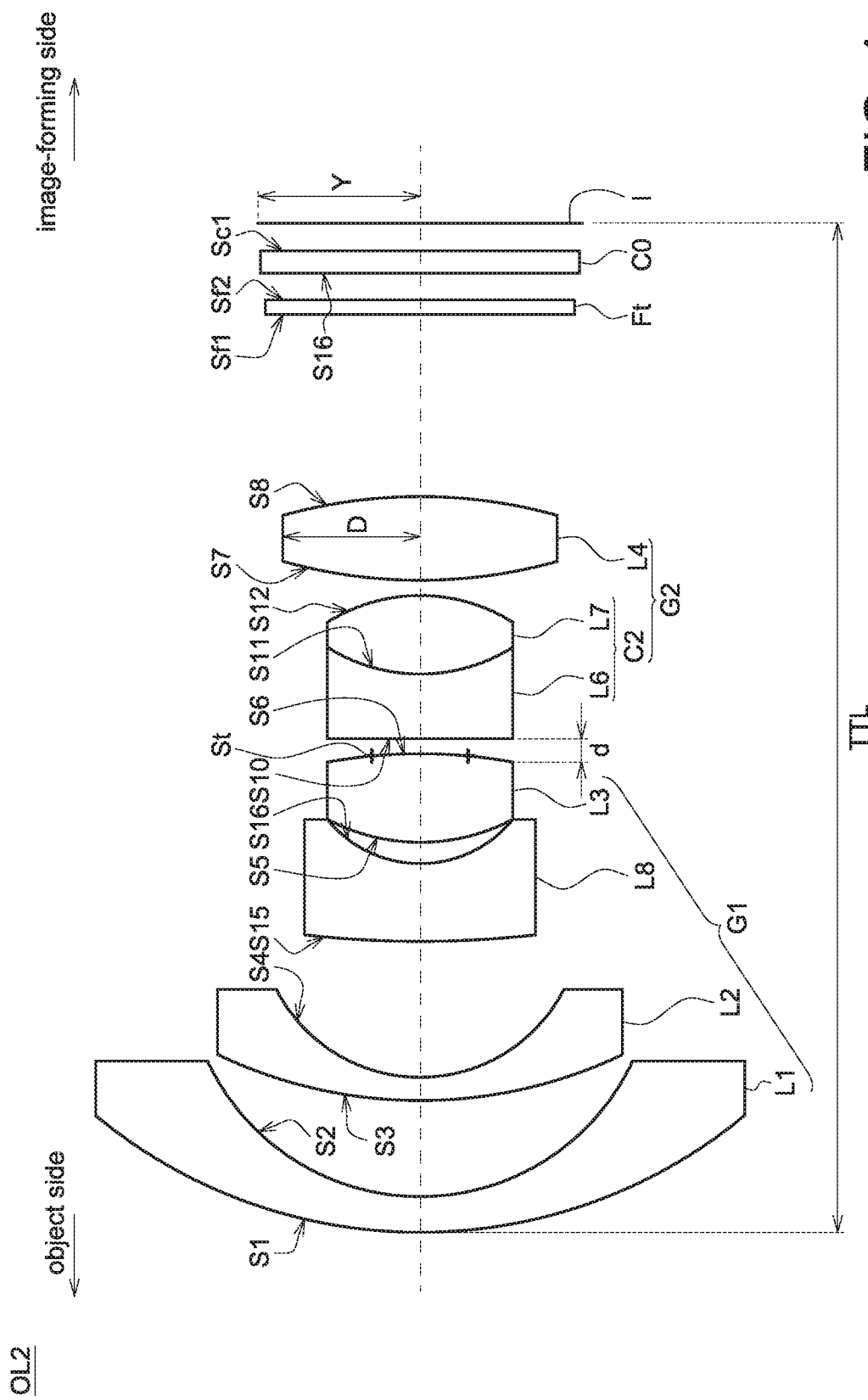
FIG. 4 shows an optical lens according to another embodiment of the present invention.

FIG. 4 shows an optical lens OL2 according to another embodiment of the present invention. In this embodiment, the optical lens OL2 is similar to the optical lens OL1 and mostly applies the same terms and labels for the same components. The difference from the optical lens OL2 and the optical lens OL1 is: the optical lens OL2 further includes an eighth lens L8 between the second lens L2 and the third lens L3. Furthermore, in another embodiment, a cemented lens C2 may at least include the sixth lens L6 and the seventh lens L7. In one more embodiment, the cemented lens C2 between the third lens L3 and the fourth lens L4 may be composed of two lenses.

As shown in FIG. 4, the optical lens OL2, in order from the object side to the image-forming side, may include the first lens L1, the second lens L2, the eighth lens L8, the third lens L3, the cemented lens C2 and the fourth lens L4. The cemented lens C2, in order from the object side to the image-forming side, at least includes the sixth lens L6 and the seventh lens L7. The difference from the cemented lens C1 and the cemented lens C2 is that the cemented lens C1 further includes a fifth lens L5 between the third lens L3 and the sixth lens L6; that is, the fifth lens L5 of the cemented lens C1 is disposed between the third lens L3 and the sixth lens L6.

In one embodiment, the first lens group G1 has negative refractive power and includes the first lens L1, the second lens L2, the eighth lens L8 and the third lens L3. The second lens group G2 has positive refractive power and includes the sixth lens L6, the seventh lens L7 and the fourth lens L4.

In one embodiment, the eighth lens L8 may be a glass lens made of a glass material or a plastic lens made of a plastic material.

In one embodiment, the eighth lens L8 may be a spheric lens, a free-form lens or an aspheric lens. Specifically, the eighth lens L8 may be a glass spheric lens, a plastic spheric lens, a glass free-form lens, a plastic free-form lens, a glass aspheric lens or a plastic aspheric lens.

In one embodiment, the eighth lens L8 may have refractive power. In another embodiment, the eighth lens L8 may have negative refractive power.

In one embodiment, the object-side surface S15 of the eighth lens L8 may have positive refractive rate and may be a convex surface toward the object side. The image-side surface S16 of the eighth lens L8 may have positive refractive rate and may be a concave surface toward the object side. Furthermore, the eighth lens L8 may be a lens having negative refractive power, such as a convex-concave lens having negative refractive power including but not limited to a convex-concave plastic lens or a convex-concave glass lens. In addition, the object-side surface S15 and the image-side surface S16 may be a spheric surface, a free-form surface and/or an aspheric surface respectively.

FIG. 5 lists one embodiment of the optical lens OL2. The embodiment includes the curvature radius, the thickness, the refractive index, the Abbe number, and so on of each of the lenses, where the surface numbers and arrangement of the lenses are approximately the same as those in FIG. 2A.

Figure 6B:
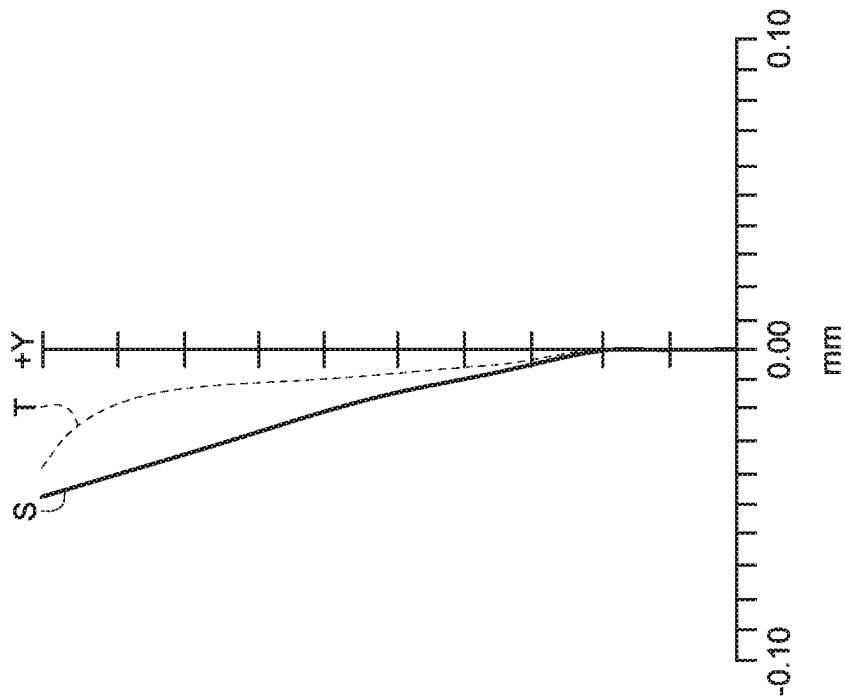
FIG. 6B shows a field curvature chart of the optical lens according to another embodiment of the present invention.
Figure 6A:
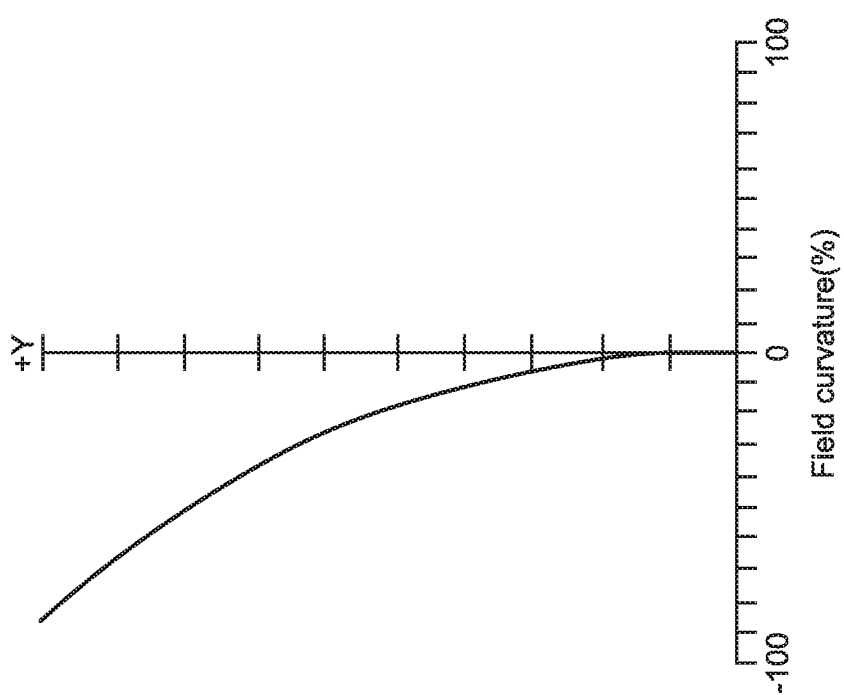
FIG. 6A shows a distortion chart of the optical lens according to another embodiment of the present invention.

FIG. 6A shows a distortion chart of the optical lens OL2 according to another embodiment of the present invention. As shown in the drawing, the distortion values for light beams are all controlled within favorable ranges.

FIG. 6B shows a field curvature chart of the optical lens OL2 according to another embodiment of the present invention. The curves T and S respectively stand for the aberration of the optical lens OL2 to the tangential rays and the sagittal rays. As shown in the drawing, the tangential values and the sagittal values of light beams are all controlled within favorable ranges.

Furthermore, FIG. 7 lists information of the optical lenses OL1, OL2 according to the embodiments of the present invention, wherein FOV is field of view, and FNO is aperture.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical lens system, at least comprising:
a first lens having negative refractive power;
a second lens having negative refractive power;
a third lens having refractive power and having an Abbe number Vd3, wherein $15 \leq Vd3 \leq 30$;
an inserted lens having refractive power;
a sixth lens having refractive power;
a seventh lens having refractive power; and
a fourth lens having refractive power and having an Abbe number Vd4, wherein $60 \leq Vd4 \leq 85$;
wherein F is a focal length of the optical lens system, and the optical lens system satisfies one of the following conditions:
in order from an object side to an image-forming side is the first lens, the second lens, the third lens, the inserted lens, the sixth lens, the seventh lens and the fourth lens, $d/F \leq 0.45$, and d is a distance between the third lens and the inserted lens; and
in order from an object side to an image-forming side is the first lens, the second lens, the inserted lens, the third lens, the sixth lens, the seventh lens and the fourth lens, $d/F \leq 0.45$, and d is a distance between the third lens and the sixth lens.

2. The optical lens system according to claim 1, wherein the optical lens system satisfies at least one of the following conditions: the third lens has positive refractive power, and the fourth lens has positive refractive power.

3. The optical lens system according to claim 1, wherein the optical lens system satisfies one of the following conditions:
the inserted lens, the sixth lens and the seventh lens form a cemented lens; and
the sixth lens and the seventh lens form the cemented lens.

4. The optical lens system according to claim 3, wherein the optical lens system satisfies at least one of the following conditions: an optical effect of the first lens, the second lens and the third lens is negative refractive power, or an optical effect of the cemented lens and the fourth lens is positive refractive power.

5. The optical lens system according to claim 1, wherein the optical lens system satisfies one of the following conditions:
the inserted lens is disposed between the third lens and the sixth lens and has positive refractive power; and
the inserted lens is disposed between the second lens and the third lens and has negative refractive power.

6. An optical lens system, at least comprising:
a first lens having negative refractive power;
a second lens having refractive power;
a third lens having an Abbe number Vd3, the third lens is a biconvex lens, wherein 15≤Vd3≤30;
an inserted lens having refractive power;
a sixth lens having refractive power;
a seventh lens having refractive power; and
a fourth lens having an Abbe number Vd4, the fourth lens is a biconvex lens, wherein 60≤Vd4≤85;
wherein F is a focal length of the optical lens system, and the optical lens system satisfies one of the following conditions:
in order from an object side to an image-forming side is the first lens, the second lens, the third lens, the inserted lens, the sixth lens, the seventh lens and the fourth lens, d/F≤0.45, and d is a distance between the third lens and the inserted lens; and
in order from an object side to an image-forming side is the first lens, the second lens, the inserted lens, the third lens, the sixth lens, the seventh lens and the fourth lens, d/F≤0.45, and d is a distance between the third lens and the sixth lens; and
wherein the optical lens system satisfies at least one of the following conditions:
the sixth lens has negative refractive power; and
the seventh lens has positive refractive power.

7. The optical lens system according to claim 6, wherein the optical lens system satisfies at least one of the following conditions: the third lens has positive refractive power, and the fourth lens has positive refractive power.

8. The optical lens system according to claim 6, wherein the optical lens system satisfies one of the following conditions:
the inserted lens, the sixth lens and the seventh lens form a cemented lens; and
the sixth lens and the seventh lens form the cemented lens.

9. The optical lens system according to claim 6, wherein the optical lens system satisfies one of the following conditions:
the inserted lens is disposed between the third lens and the sixth lens and has positive refractive power; and
the inserted lens is disposed between the second lens and the third lens and has negative refractive power.

10. The optical lens system according to claim 8, wherein the optical lens system satisfies at least one of the following conditions: an optical effect of the first lens, the second lens and the third lens is negative refractive power, or an optical effect of the cemented lens and the fourth lens is positive refractive power.

11. An optical lens system, at least comprising:
a first lens having negative refractive power;
a second lens having refractive power;
a third lens having an Abbe number Vd3, wherein 15≤Vd3≤30;
an inserted lens having refractive power;
a sixth lens having refractive power;
a seventh lens having refractive power; and
a fourth lens having an Abbe number Vd4, wherein 60≤Vd4≤85;
wherein F is a focal length of the optical lens system, and the optical lens system satisfies one of the following conditions:
in order from an object side to an image-forming side is the first lens, the second lens, the third lens, the inserted lens, the sixth lens, the seventh lens and the fourth lens, d/F≤0.45, and d is a distance between the third lens and the inserted lens; and
in order from an object side to an image-forming side is the first lens, the second lens, the inserted lens, the third lens, the sixth lens, the seventh lens and the fourth lens, d/F≤0.45, and d is a distance between the third lens and the sixth lens; and
wherein the optical lens system satisfies at least one of the following conditions:
the third lens has positive refractive power; and
the fourth lens has positive refractive power.

12. The optical lens system according to claim 11, further comprising an imaging plane, and the optical lens system satisfies at least one of the following conditions: 0≤F/TTL and F/TTL≤0.25; F is a focal length of the optical lens system, and TTL is a distance between an object-side surface of the first lens and the imaging plane.

13. The optical lens system according to claim 11, wherein the optical lens system satisfies at least one of the following conditions: 0≤F/Y and F/Y≤1; F is a focal length of the optical lens system, and Y is an image height of the optical lens system.

14. The optical lens system according to claim 11, wherein the optical lens system further satisfies the condition: 0≤d/F, and d is a distance between the third lens and the inserted lens or a distance between the third lens and the sixth lens.

15. The optical lens system according to claim 11, wherein the optical lens system satisfies at least one of the following conditions: 140°≤FOV and FOV≤185°; FOV is a field of view of the optical lens system.

16. The optical lens system according to claim 11, wherein the optical lens system satisfies at least one of the following conditions: 0≤(FNO×TTL)/(FOV×Y) and (FNO×TTL)/(FOV×Y)≤0.2; FNO is an aperture of the optical lens system, FOV is a field of view of the optical lens system, Y is an image height of the optical lens system, and TTL is a distance between an object-side surface of the first lens and an imaging plane of the optical lens system.

17. The optical lens system according to claim 11, wherein the optical lens system satisfies at least one of the following conditions: 1.33≤D/Y and D/Y≤2.47; Y is an image height of the optical lens system, and D is an effective diameter of the fourth lens.

18. The optical lens system according to claim 11, wherein the optical lens system satisfies one of the following conditions:

the inserted lens, the sixth lens and the seventh lens form a cemented lens; and the sixth lens and the seventh lens form the cemented lens.

19. The optical lens system according to claim 18, wherein the optical lens system satisfies at least one of the following conditions: an optical effect of the first lens, the second lens and the third lens is negative refractive power, or an optical effect of the cemented lens and the fourth lens is positive refractive power.

20. The optical lens system according to claim 11, wherein the optical lens system satisfies one of the following conditions:

the inserted lens is disposed between the third lens and the sixth lens and has positive refractive power; and the inserted lens is disposed between the second lens and the third lens and has negative refractive power.

\* \* \* \* \*